Sept. 20, 1966 S. C. BROWN 3,274,509
DIFFERENTIAL AMPLIFIER
Filed April 22, 1960 2 Sheets-Sheet 1

INVENTOR.
Stewart C. Brown
By Robert H. Lentz
Attorney

Sept. 20, 1966  S. C. BROWN  3,274,509
DIFFERENTIAL AMPLIFIER
Filed April 22, 1960  2 Sheets-Sheet 2
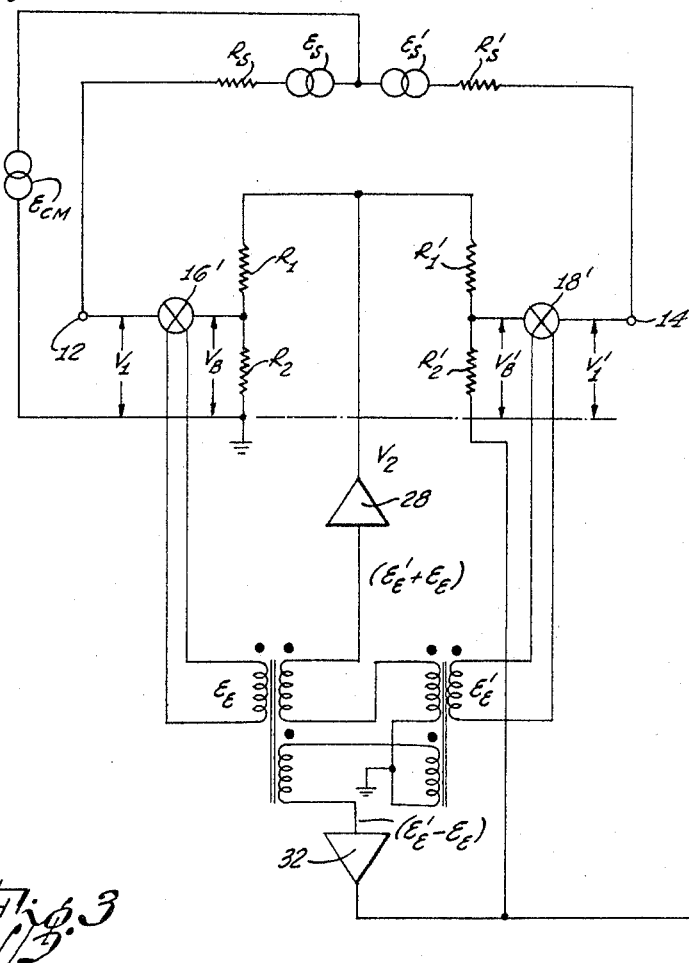
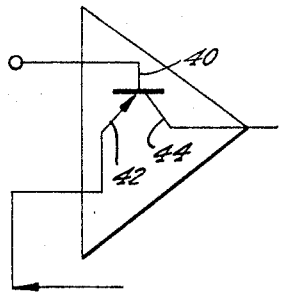
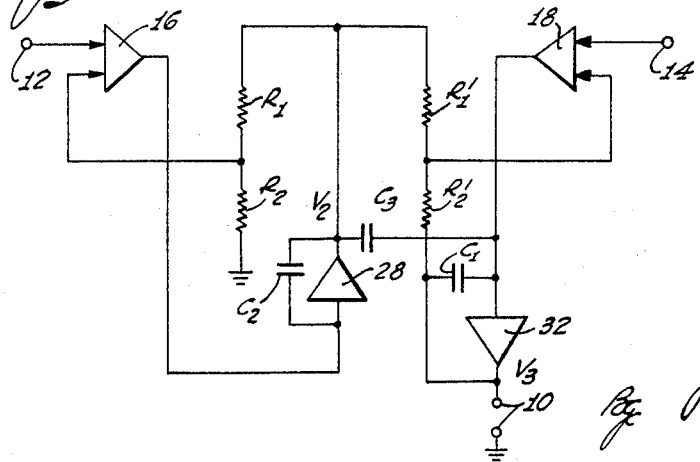
INVENTOR:
Stewart C. Brown
By Robert H. Lentz
Attorney

United States Patent Office 3,274,509
Patented Sept. 20, 1966

3,274,509
DIFFERENTIAL AMPLIFIER
Stewart C. Brown, 10354 Oklahoma Ave.,
Chatsworth, Calif.
Filed Apr. 22, 1960, Ser. No. 23,964
9 Claims. (Cl. 330—116)

This invention relates to differential amplifiers, and more particularly to a broadband differential amplifier which exhibits extra-ordinarily high and stable common mode rejection.

The term "common mode signal," as hereinafter utilized and as known in the differential amplifier art, refers to a spurious signal which, through reactive coupling to the input conductors, or other electrical phenomena such as the difference in ground potential at remotely located points, appears in phase at both of the amplifier input terminals simultaneously. In contra-distinction, the applied differential input signal, representing useful intelligence, is applied across the amplifier input terminals and may thus be considered as a pair of input signals which are of equal amplitude and continuously out of phase as they appear at the input terminals.

The term "common mode rejection," as somewhat loosely defined by the prior art, refers to the ratio of common mode voltage or signal to the equivalent spurious differential input signal it produces at the amplifier input circuit. As hereinafter utilized in describing the present invention, however, the term "common mode rejection" is defined more rigorously as the ratio representing the change in the relative magnitudes of the common mode signal and the applied or useful differential input signal as they exist at the amplifier input circuit and as they exist subsequently at the output circuit, or stated differently, is a measure of the amplification which is imparted to the intelligence containing differential signal relative to the amplification of the common mode signal.

The growing need for differential amplifiers having high common mode rejection is related directly to the growing use of remotely located electronic instrumentation in data-acquisition systems, as for example in the guided missile field wherein signals generated at a test stand or pad are amplified and monitored at remote locations. Since the signals produced by many conventional transducers such as strain gauges or thermocouples, for example, are of a relatively low level, it follows that the acquisition of precise data at a remote location can only be accomplished through the use of amplifier circuits which effectively suppress common mode signals.

In the prior art most initial attempts at suppressing common mode signals involved the use of conventional differential amplifiers having relatively high input impedance to thereby overcome the effect of any imbalance in the source impedances, as viewed from the input terminals, which would otherwise cause the common mode signal to produce a spurious differential signal. While this technique brought with it a certain measure of improvement, it is inherently limited by the fact that the ability of the amplifier circuit to present identical input impedances and to offset the common mode signals received varies directly as a function of the amplifier component tolerances. It should be noted, furthermore, that this latter limitation applies even if the source impedances were perfectly balanced or non-existent.

As a result of the foregoing limitations the art has turned to more sophisticated circuit arrangements, such as the differential amplifier described in the article beginning at page 43 of the July 24, 1959, issue of Electronics, published by McGraw-Hill, New York, N.Y. As shown in the referenced article, there is disclosed a differential amplifier which employs positive feedback to equalize the currents through the differential input terminals in a circuit where amplifier gain is established by the resistance ratio in a negative feedback bridge circuit. Parenthetically, it may be noted that the foregoing amplifier circuit, without the addition of positive feedback, is typical of the prior art differential amplifiers referred to previously.

While in theory the referenced circuit will provide excellent common mode rejection, analysis reveals that the common mode rejection afforded thereby will vary in accordance with the variations in bridge resistor values, or in other words, that its common mode rejection is no better than the component tolerances. Since there is a real and practical limitation which must be imposed on component accuracy, especially when one hypothesizes a perfectly balanced bridge circuit, it follows that the theoretically achievable common mode rejection cannot be attained, and that a common mode rejection figure within the range from one thousand to ten thousand is the most which can be expected.

The present invention, on the other hand obviates the foregoing and other disadvantages of the differential amplifiers of the prior art, and provides a differential amplifier which is readily capable in practice of providing common mode rejection of a million to one or better. In accordance with the basic concept of the present invention, there is provided a differential amplifier wherein there is generated a first feedback signal which varies in accordance with common mode signals received and which is applied to the amplifier input circuit to suppress common mode signals, and a second feedback circuit which is employed across a high gain amplifier to provide simultaneous amplification of the differential input signal.

More particularly, in its most general form the differential amplifier of the invention includes a pair of differencing circuits or error amplifiers across which the differential signal is applied. Each error amplifier is included in a common mode feedback loop, including a common bridge circuit, for receiving an error signal to reduce the applied input signals in accordance with the magnitude of the common mode signal component received. The differential signal, as represented by the output signal from one or both of the error amplifiers, on the other hand, is in turn presented as the differential output signal after having been amplified by a high gain amplifier whose gain is controlled through a second feedback loop which feeds back to the input error amplifiers through the common bridge circuit.

As will be disclosed in more detail hereinbelow, the novel differential amplifier of the invention functions to amplify the applied differential signal in accordance with the ratio of the impedance values of the bridge circuit components, while common mode signals received are suppressed or attenuated simultaneously by an amount corresponding to the reciprocal of the tolerance to which the bridge circuit components are matched. As a consequence, common mode signal supression of one thousand to one may be achieved readily through the use of commercially available components, while the intelligence containing differential input signal is being amplified in accordance with the bridge impedance ratio which may exceed one thousand to one, thereby providing common mode rejection equal to or surpassing one million to one.

In accordance with one embodiment of the invention, the common mode feedback signal is obtained by adding the output signals received from the input error amplifiers, the error signal thereby obtained being amplified and thereafter applied to the common junction of a symmetrical bridge circuit from which the error amplifiers derive their feedback signals. The differential output signal, on the other hand, is obtained by amplifying the signal received from a subtractor circuit which functions to subtract the error amplifier output signals, the differential output signal being in turn applied to one leg of the bridge circuit remote from the aforesaid common junction to thereby establish the overall loop gain of the amplifier.

In accordance with another embodiment of the invention, the common mode feedback signal applied to the bridge circuit is obtained by amplifying directly the output signal from one of the error amplifiers, while the differential output signal is obtained by amplifying the output signal presented by the other of the error amplifiers, the feedback circuits to the error amplifiers being otherwise the same as that described previously. In this embodiment of the invention, therefore, use is made of the fact that the common mode signals received at the input terminals of the differential amplifier are always in phase, while the differential signal is always effectively out of phase, thereby providing a circuit where the output signal from the first error amplifier drives the bridge in a manner which reduces the common mode error voltages to zero, while the output signal from the second error amplifier drives the bridge in a manner which reduces the differential error voltages to zero. Thus, the output signal from the first error amplifier is proportional to the common mode voltage (a feature which could be of some importance in special applications, such as signal splitting) and the output of the second error amplifier is proportional to the differential signal.

It is therefore an object of the present invention to provide a differential amplifier capable of providing common mode rejection substantially independent of component tolerances.

It is a further object of the invention to provide a differential amplifier wherein common mode rejection on the order of one million to one is readily and consistently achievable with commercially available components.

Another object of the invention is to provide a differential amplifier employing a bridge circuit and wherein the gain imparted to the differential signal is a function of the bridge resistance ratio while common mode signals are suppressed as a function of the reciprocal of the bridge resistance tolerances.

Still another object of the invention is to provide a differential amplifier wherein suppression of common mode signals is accomplished through a first negative feedback loop and wherein amplification of the differential input signal is achieved through the use of a second negative feedback loop.

A still further object of the invention is the provision of a differential amplifier wherein the amplification imparted to the differential input signal is determined by a bridge multiplier circuit, but wherein common mode signals are suppressed as a function of the reciprocal of the tolerance of the bridge resistors.

A further object of the invention is to provide a differential amplifier with an input impedance which is extremely high, thus insuring minimum dependence of common mode rejection on source impedance unbalance, while still retaining very low noise and drift when the amplifier is driven by a low-impedance source.

Still other objects and advantages of the invention herein disclosed will become apparent when considered in connection with the accompanying drawings in which several embodiments of the invention are illustrated by way of example. It is to be expressly understood, however, that the drawings are for purposes of illustration and description only, and should not be construed as limiting the breadth and scope of the invention as hereinafter claimed.

FIG. 2 is an equivalent circuit diagram which is useful for explaining the principles of operation of the differential amplifiers of the invention, and for illustrating how common mode rejection is thereby provided;

FIG. 3 is a block diagram of another embodiment of a differential amplifier in accordance with the invention;

FIG. 4 is a schematic diagram illustrating a simplified form of error amplifier which could be employed in the circuits of FIGS. 1 and 3.

Figure 1:
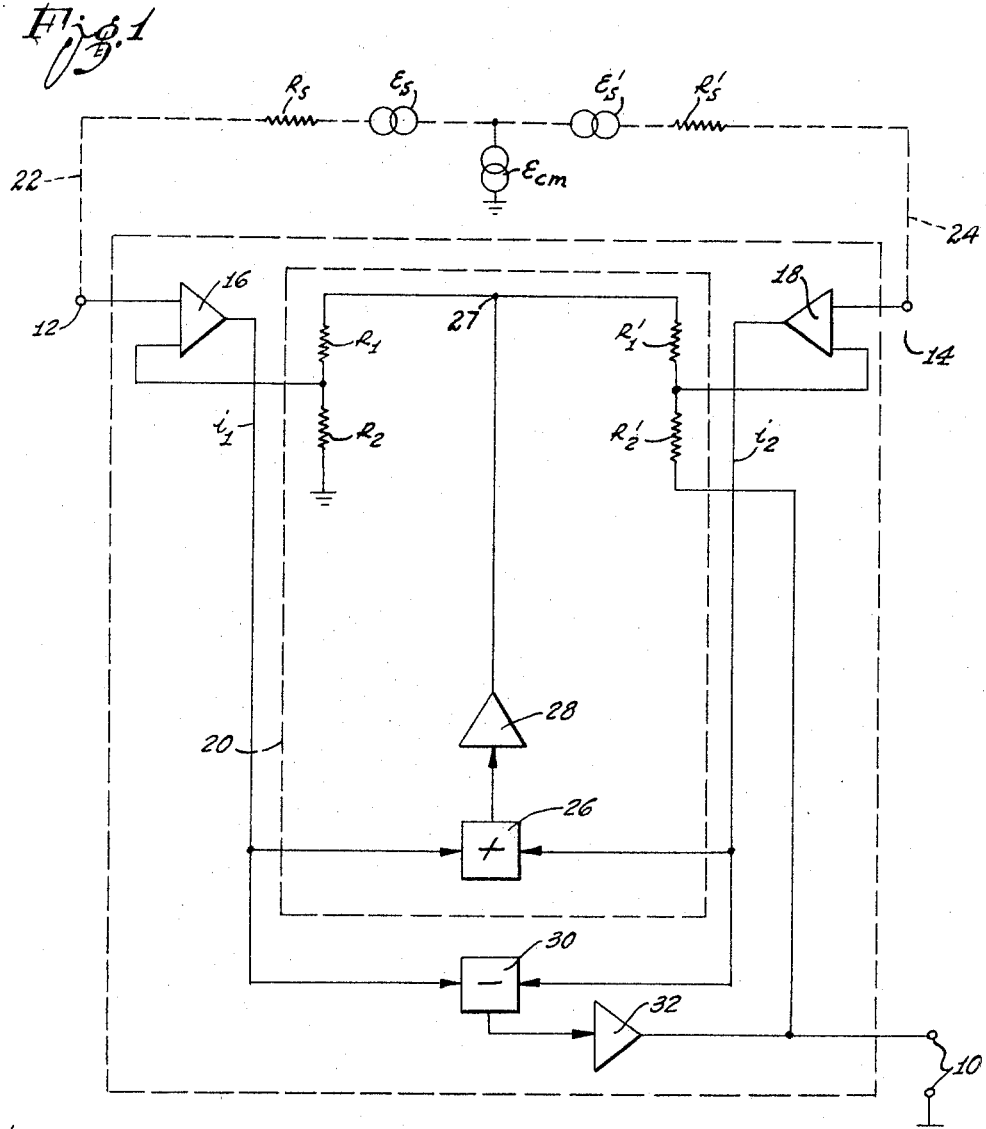
FIG. 1 is a block diagram, partly in schematic form, of a differential amplifier in accordance with the invention.

With reference now to the drawings, wherein like or corresponding parts are designated by the same reference characters throughout the several views, there is shown in FIG. 1 a differential amplifier, in accordance with the invention, which is operative to produce at a pair of output terminals 10 an amplified electrical output signal corresponding to an intelligence input signal applied across a pair of input terminals 12 and 14, while simultaneously suppressing common mode signals which may be impressed upon the amplifier input circuit. As shown in FIG. 1, the differential amplifier comprises four basic elements, namely, a pair of error amplifiers 16 and 18 respectively connected to input terminals 12 and 14, a common mode signal detection and feedback circuit 20 which includes a bridge circuit and is operative in response to the output signals from amplifiers 16 and 18, and an output circuit which is operative to present at the output terminals 10 an amplified signal representative of the difference between the output signals received from error amplifiers 16 and 18.

Before describing the various elements of the differential amplifier in more detail, it should be noted that for purposes of illustration the input intelligence signal is represented as a pair of signals $E_s$ and $E_s'$ which are generated by a pair of sources exhibiting source impedances $R_s$ and $R_s'$, respectively. It will be appreciated that this particular form of representation is useful in that the spurious common mode signals, for which the amplifier of the invention exhibits a relatively high degree of rejection or suppression, may then be represented by the signal $E_{CM}$ which is generated by the source connected intermediate the sources of signals $E_s$ and $E_s'$.

It will be appreciated further from the foregoing notation that the common mode signals appearing on the input conductors, diagrammatically shown by the dotted lines 22 and 24, are in phase but may tend to vary in amplitude at the amplifier input circuit in accordance with the relative magnitudes of the impedances $R_s$ and $R_s'$. The term "tend to vary" is utilized because in practice the extremely high input impedance presented to the applied input signals by the amplifier of the invention eliminates substantially the effect of these variations owing to the fact that the input impedance is many orders of magnitude higher than the source impedance and hence acts to limit the voltage developed across the source impedances.

Returning now to the description of the amplifier construction, each of error amplifiers 16 and 18 includes a conventional differencing mechanism, not shown in detail but which may be elementary in form for subtracting from the applied input signal the error signal which is received from circuit 20. Moreover, the error amplifiers are preferably chopper stabilized with relatively high gain and low drift, the use of choppers being determined obviously by whether or not the application in which the differential amplifier is to be employed requires direct current or low frequency response. In fact, as will be demonstrated subsequently with reference to FIG. 4, the construction of the error amplifiers can become extremely elementary if the systems application will permit.

Continuing, it is important to note at this point that the error amplifiers do not have to exhibit high linearity, owing to the fact that they are included in a negative feedback loop. Moreover, the input impedance of the amplifier looking into each of the input terminals individually need not be especially high in view of the fact that an effectively high and theoretically infinite input impedance is presented to the input intelligence signal by compensating for current drain with a feedback signal whose magnitude is equal and opposite to that of the input signal.

It should be further noted at this point that for certain applications it may also be desirable to be able to vary the gain of the error amplifiers. More particularly, it may be demonstrated by consideration of the dynamic loop gain that if one wishes to vary the relative values of the impedances employed in the bridge circuit to be described in detail hereinafter, then the gain of amplifiers 16 and 18 should be varied concomitantly if the overall amplifier circuit is to present a substantially constant frequency response.

Continuing, the common mode signal detection and feedback circuit 20 comprises an arithmetic unit or adder 26 which is coupled to the output circuits of amplifiers 16 and 18 and is responsive to the signals received therefrom for generating an output signal representative of and corresponding to the sum of the signals generated by the error amplifiers. This signal is in turn amplified by a common mode amplifier 28 and is thereafter applied to the common junction 27 of a bridge circuit comprising a plurality of resistors designated $R_1$, $R_2$, $R_1'$ and $R_2'$, respectively.

Adding circuit 26 may be any circuit known to the art which is operative to produce an output signal whose amplitude is proportionate to and representative of the sum of a pair of applied input signals, as for example a simple resistive adding circuit. Common mode amplifier 28, on the other hand, is preferably chopper stabilized with high gain and minimal offset error so as to insure that the feedback signal applied to the bridge circuit is properly representative of the signal received from adding circuit 26.

As shown in FIG. 1, the resistors of the bridge circuit are connected in a pair of parallel paths, the common mode compensating signal delivered by amplifier 28 being applied to one end of each of resistors $R_1$ and $R_1'$. The other ends of resistors $R_1$ and $R_1'$ in turn are connected respectively to resistors $R_2$ and $R_2'$ from which points the feedback signals for error amplifiers 16 and 18 are derived, while the other end of these latter two resistors are connected respectively to ground and to output terminal 10, respectively.

As will be understood more fully from the detailed description set forth hereinafter, resistors $R_1$ and $R_1'$ are substantially identical in value, as are resistors $R_2$ and $R_2'$, thus assuring that the resistance ratio $$\frac{R_1}{R_1+R_2}$$

is also substantially identical to the ratio $$\frac{R_1'}{R_1'+R_2'}$$

It is important to note here, however, that while the relative values of these resistors are reasonably precise, they are also readily realizable physically because of the fact that the extremely high common mode rejection provided by the amplifier of the invention is not merely a function of the relative precision of the resistors. More particularly, it will be demonstrated that the common mode rejection afforded by the amplifier of the invention is approximately equal to the ratio $$\frac{R_1+R_2}{R_1}$$

of the resistors in the bridge circuit, multiplied by the reciprocal of the component tolerance. Thus, if one assumes that the bridge resistors are accurate to one part in one thousand, a figure of merit to which many commercially available resistors conform, and that the overall amplifier gain as given by the bridge resistor ratio is one thousand, it follows that rejection of common mode signals is almost completely insensitive to variations in resistance values, especially when one considers the extremely high common mode rejection obtained.

To illustrate the foregoing discussion, common mode rejection of 120 db as expressed in the vernacular of the amplifier art, or more precisely one million to one, may be obtained and thereafter maintained in an amplifier constructed in accordance with the invention by employing a bridge resistor ratio of $$\frac{R_1+R_2}{R_1}=1000$$

and a cross ratioed resistor tolerance of one part in one thousand or better, notwithstanding the fact that the bridge resistors are selected from commercially available stocks. Moreover, in amplifiers which have been constructed using bridge resistors which are cross referenced to a tolerance of two parts in ten thousand, even higher common mode rejection has been achieved.

Returning once more to the description of FIG. 1, the amplifier of the invention is completed by the output circuit which includes a differencing or subtractor circuit 30 which is operable to produce a signal corresponding to the difference between the signals received from error amplifiers 16 and 18. This signal is then applied to an output amplifier 32 which functions to amplify the difference signal and present the amplified signal at output terminals 10. In addition, the output signal is also applied to resistor $R_2'$ in the bridge circuit to thereby provide negative feedback in the conventional manner.

Subtractor circuit 30 may also comprise any of numerous circuits known to the art, and may for example, include a resistive adder of the type described hereinabove with respect to adder 26, and an associated inverting circuit for inverting the signal received from the appropriate error amplifier. The output amplifier 32, in turn, is preferably a chopper stabilized high gain amplifier, and may be of conventional design.

Considering now the operation of the differential amplifier of the invention from a qualitative standpoint, it is helpful in analyzing common mode rejection to assume that the useful intelligence signal represented by generators $E_s$ and $E_s'$ is zero. It will be appreciated then that the common mode signal $E_{CM}$ which is impressed upon both input conductors will produce a pair of output signals represented in FIG. 1 by currents $i_1$ and $i_2$, which currents are summed by adder 26, amplified by amplifier 28, and are then applied to the bridge circuit. The error signals which are derived from the bridge circuit are then applied to the input circuit of the error amplifiers to compensate precisely for any current which would otherwise be drained from the common mode signal source, and hence function to reduce currents $i_1$ and $i_2$ to relatively minute values.

It should be noted at this point that the feedback signals derived from the bridge circuit due to common mode signals represent negative feedback through which the circuit reaches an equilibrium condition in accordance with the magnitude of the common mode signal. Furthermore, in view of the theoretically infinite gain of common mode amplifier 28, it will be recognized that the magnitude of the error amplifier output signal component due to common mode input signals will be exceptionally small, and that if it is assumed that the identical common mode signal is received at both input terminals 12 and 14, then variation between the minute error amplifier output signals will occur only as a function of imbalance in the bridge circuit occasioned by the component tolerances, multiplied by the resistance ratio $$\frac{R_1}{R_1+R_2}$$

That this is so may be established through perturbation of the bridge circuit by assuming a bridge imbalance as would be occasioned by using commercially available components, in which case the relatively minute error amplifier output signal components due to common mode signals will exhibit a similar variation.

In view of the fact that the output signals from error amplifiers 16 and 18 are subtracted by subtractor 30 and then amplified in order to obtain an output differential or intelligence signal and since the gain provided by the output amplifier 32 as discussed below is equal to the inverse bridge ratio $$\frac{R_1+R_2}{R_1}$$

it follows from the discussion set forth above that the common mode signal, independently from the useful input signal, is suppressed by the amplifier of the invention as a direct function of the reciprocal of the bridge component tolerance. Moreover, as will be understood from the ensuing description, this suppression of common mode signals occurs simultaneously with the amplification of the useful or differential input signal.

More specifically, if it is now assumed that differential signals $E_s$ and $E_s'$ are applied at input terminals 12 and 14 simultaneously with the application of the common mode signal, it will be recognized that the composite output signals from the error amplifiers will include out-of-phase components representative of the differential signal $E_s$ plus $E_s'$, and in phase components representative of the common mode signal. Accordingly, the common mode detection and feedback circuit 20 will function in the manner described previously to suppress common mode signals, but will be insensitive to the useful differential signal owing to the fact that adder circuit 26 will produce no output signal from the opposing current components due to the differential signal.

Conversely, the useful or differential signal components are operated upon by subtractor 30 to produce a differential signal which is presented at output terminals 10 after amplification by amplifier 32. Notwithstanding the theoretically infinite open loop gain of this amplifier, however, the net gain imparted to the applied differential signal is determined by the bridge resistor ratio $$\frac{R_1+R_2}{R_1}$$

in view of the stabilizing negative feedback loop completed from the output circuit of amplifier 32 through the bridge circuit to the input of the error amplifiers.

It is extremely important to note that the foregoing discussion of the circuit of FIG. 1 is applicable irrespective of the value of the source impedances $R_s$ and $R_s'$, or stated differently also represents the behavior of the amplifier of the invention with respect to any internally induced common mode signals, such as might appear in the conventional circuits of the prior art with the amplifier input terminals short circuited to each other. In addition to this unique feature of the invention, however, the amplifier also presents an extremely high input impedance to the signals impressed thereon, and thus also functions in the manner more familiar to the art to minimize the effect of any imbalance which might exist between the source impedances $R_s$ and $R_s'$.

In order to present the operation of the differential amplifier of the invention in a more quantitative manner, reference will now be made to the circuit of FIG. 2 which is a differential amplifier identical to that shown in FIG. 1 except that the error amplifiers 16 and 18 are here shown schematically as a pair of differencing mechanisms 16' and 18' having unity gain and infinite input impedance, while the adder and subtractor circuits 26 and 30 of FIG. 1 are mechanized by a pair of perfect transformers having unity turns ratio.

If now one assigns the convention that $$\frac{R_1}{R_1+R_2}=\lambda \text{ and } \frac{R_1'}{R_1'+R_2'}=\lambda' \quad (1)$$

then $$\frac{R_2}{R_1+R_2}=(1-\lambda) \text{ and } \frac{R_2'}{R_1'+R_2'}=(1-\lambda') \quad (2)$$

Furthermore, if one designates the error signals from differencing mechanisms 16' and 18' as signals $E_E$ and $E_E'$, respectively, it will be seen that the output signal $V_2$ from the common mode amplifier 28 is given by the equation $$V_2=(E_E'+E_E)A_{cm} \quad (3)$$

while the output signal $V_3$ from the overall amplifier is given by the equation $$V_3=(E_E'-E_E)A_s \quad (4)$$

Relating the error signals $E_E$ and $E_E'$ to the input signals and the voltage developed across resistors $R_2$ and $R_2'$ then yields the equations $$E_E'=V_1'-V_B'=E_{cm}+E_s'+(\lambda'-1)V_2-\lambda'V_3 \quad (5)$$

$$E_E=V_1-V_B=E_{cm}-E_s+(\lambda-1)V_2 \quad (6)$$

which when substituted in Equation 4 reduces to $$V_3=[E_s'+E_s+(\lambda'-\lambda)V_2-\lambda'V_3]A_s \quad (7)$$

Noting now that the common mode signal vanishes at the output circuit only if $E_E=E_E'$, assume that for a slight disturbance in the bridge circuit $\lambda=\lambda'+\Delta\lambda'$ where $\Delta$ corresponds, for example, to the cross-ratioed tolerance of the bridge resistors. Making use of these relationships in Equation 7 then gives $$V_3=[E_s'+E_s-\Delta\lambda'V_2-\lambda'V_3]A_s \quad (8)$$

which in turn transforms to $$\frac{E_s'+E_s}{V_3}=\lambda'+\frac{1}{A_s}+\frac{\Delta\lambda'V_2}{V} \quad (9)$$

In a similar manner, substituting Equations 5 and 6 in Equation 3 gives the relationship $$V_2=[2E_{cm}+E_s'-E_s+(\lambda'-1)V_2 +(\lambda-1)V_2-\lambda'V_3]A_{cm} \quad (10)$$

assuming again a slight disturbance in the bridge circuit such that $\lambda=\lambda'+\Delta\lambda'$ then gives $$V_2=[2E_{cm}+E_s'-E_s+(2\lambda' -2+\Delta\lambda')V_2-\lambda'V_3]A_{cm} \quad (11)$$

which reduces to $$V_2=\frac{2E_{cm}+E_s'-E_s-\lambda'V_3}{2-2\lambda'-\Delta\lambda'+\dfrac{1}{A_{cm}}} \quad (12)$$

Substituting Equation 12 in Equation 9 provides the relationship $$\frac{E_s'+E_s}{V_3}=\lambda'+\frac{1}{A_s}+\frac{\Delta\lambda'}{V_3}\left[\frac{2E_{cm}+E_s'-E_s-\lambda'V_3}{2-2\lambda'-\Delta\lambda'+\dfrac{1}{A_{cm}}}\right] \quad (13)$$

Since $\lambda'V_3$ is very nearly equal to $E_s'+E_s$, and since the gains $A_{cm}$ and $A_s$ of amplifiers 28 and 32 may be assumed to be infinite, Equation 13 may be rewritten as $$\frac{E_s'+E_s}{V_3}=\lambda'+\frac{\Delta\lambda'}{V_3}\left[\frac{E_{cm}-E_s}{1-\lambda'-\dfrac{\Delta\lambda'}{2}}\right] \quad (14)$$

In order to derive the relationship defining common mode rejection, let $$E_s'=E_s=o \quad (15)$$

then $o=$ $$\lambda'V_3+\Delta\lambda'\left[\frac{E_{cm}}{1-\lambda'-\dfrac{\Delta\lambda'}{2}}\right] \quad (16)$$

If now it is assumed that the bridge resistance ratio $\lambda'$, which is the reciprocal of the closed loop gain of the amplifier, is very small in comparison with unity, then Equation 16 provides the relationship $$\frac{V_3}{E_{cm}} = \Delta \qquad (17)$$

which signifies that the common mode signal itself is suppressed in the output signal relative to its amplitude at the input circuit by a factor approximately equal to the reciprocal of the tolerance of the bridge resistors. Conversely, it also follows from Equation 14 that the amplification simultaneously imparted to the difference signal or intelligence signal by the amplifier of the invention is given by the expression $$\frac{V_3}{E_s' + E_s} = \frac{1}{\lambda'} \qquad (18)$$

which reveals that the intelligence signal is amplified as a reciprocal function of the bridge resistor ratio even as the common mode signal is being greatly suppressed. Hence, the common mode rejection M of the amplifier of the invention expressed as a function of the relative magnitudes of the common mode signal and the useful intelligence signal as they exist at the amplifier output circuit interms of the applied input signals is given by the expression $$M = \left(\frac{\text{output intelligence}}{\text{output comon mode}}\right) = \frac{E_s' + E_s}{\frac{\lambda'}{\Delta E_{cm}}} = \frac{E_s' + E_s}{E_{cm}}\left(\frac{1}{\Delta \lambda'}\right) \qquad (19)$$

or $$\text{Comon Mode Rejection} = \frac{1}{\Delta \lambda'} \qquad (20)$$

This latter expression thus signifies that the common mode rejection is substantially equal to the closed loop gain of the amplifier $$\left(\frac{1}{\lambda'}\right)$$

times the reciprocal of the component tolerance $$\left(\frac{1}{\Delta}\right)$$

To further illustrate the concept, in actual practice a common mode rejection figure of five million to one has been achieved through the use of a closed loop gain of 1000 provided by making the bridge resistance ratio $$\frac{R_1 + R_2}{R_1} = 1000$$

and by using bridge resistors which were cross-referenced to a tolerance of .02%, the reciprocal of which will be recognized to be 5000.

While the circuit of FIG. 2 has been utilized only in an illustrative manner to represent mathematically the operation of the amplifier of the invention, it will of course be appreciated that this particular circuit does represent an alternative embodiment of the invention which conceivably could be employed in certain applications. More specifically, while the circuit of FIG. 1 was described as being operational from direct current up to frequencies on the order of several hundred kilocycles, the use of transformers in the addition and substraction circuits of FIG. 2 would naturally limit this embodiment of the invention to operation at frequencies within the useful operating frequency band of the transformers.

It should be further noted that while the amplifier of the invention as thus far described has been shown to make use of the output signals from both error emplifiers in suppressing common mode signals and simultaneously providing an amplified differential output signal, one may readily devise further simplified circuits based upon the teachings of the invention where the end use of the amplifier will permit. With reference to FIG. 3, for example, there is shown another embodiment of a differential amplifier, in accordance with the invention, wherein common mode amplifier 28 is driven by the output signal from error amplifier 16 alone, whereas output amplifier 32 receives only the output signal from error amplifier 18. In addition, this embodiment of the invention also includes three capacitors, designated $C_1$, $C_2$ and $C_3$ in FIG. 3, the first two of which are connected between the input and output circuits of amplifiers 32 and 28, respectively, while capacitor $C_3$ interconnects the output circuit of amplifier 28 to the input circuit of amplifier 32. The function of these capacitors, which are important from the standpoint of high frequency operation of the differential amplifier, will be discussed more fully hereinbelow.

Considering now the operation of the differential amplifier of FIG. 3, and more particularly the D.C. or low frequency response thereof, assume first that the same input signal sources shown in FIG. 2 are applied to the circuit of FIG. 3. It may then be shown that the voltages $V_2$ and $V_3$ are given by the equations $$V_2 = \frac{E_{cm} - E_s}{\frac{1}{A_{cm}} + 1 - \lambda} \qquad (21)$$

$$V_3 = \frac{E_{cm} + E_s' - (1 - \lambda')V_2}{\frac{1}{A_s} + \lambda'} \qquad (22)$$

which through substitution and the assumption of infinite open loop amplifier gain provides the relationship $$V_3 = \frac{E_{cm} + E_s' - (1 - \lambda')\frac{E_{cm} - E_s}{(1 - \lambda')} + \Delta \lambda'}{\lambda'} \qquad (23)$$

Solving the latter equation for the relationship of output signal $V_3$ with respect to the common mode signal, and with respect to the differential signal, in turn provides $$\frac{V_3}{E_{cm}} = \Delta \qquad (24)$$

and $$\frac{V_3}{2E_s} = \frac{1}{\lambda'} \qquad (25)$$

which will be recognized as corresponding to Equations 17 and 18 developed hereinabove with reference to the basic circuit of FIGS. 1 and 2. Thus, the low frequency response of the circuit of FIG. 3 is clearly the same as for the circuits described previously, and provides common mode rejection in a substantially identical manner.

From a high frequency standpoint, on the other hand, capacitors $C_1$ and $C_2$ are employed to provide a measure of derivative control and thereby overcome the limitations on system performance which would otherwise be imposed by the relatively slow response of amplifiers 28 and 32 standing alone. More particularly, it may be shown that the frequency response of the system with the addition of capacitors $C_1$ and $C_2$ is directly related to the R.C. time constant of the charging circuit presented by each capacitor and the associated bridge resistor to which it is coupled. Thus, if bridge resistors $R_1$ and $R_2$ have values of 200 ohms and 1800 ohms, for example, or in other words are related by the ratio of one to nine, it will be appreciated that capacitors $C_1$ and $C_2$ should be related by the same ratio if the respective R.C. time constants are to be maintained substantially equal. Assuming then that a time constant on the order of .9 microsecond would be sufficient to provide a rise time enabling substantially flat system response up to 200 kilocycles, it follows that capacitor $C_1$ and $C_2$ should have values of 500 μμfarad and 4500 μμfarad, respectively, which values have been found in practice to perform satisfactorily.

Capacitor $C_3$, on the other hand, is employed in the circuit to provide a compensating current to the input or node of output amplifier 32 to compensate for high frequency common mode signal components present in the output current from error amplifier 18, which components would otherwise produce a net error in the differential output signal. In practice it has been found that the selection of a 4500 μμfarad value for capacitor $C_3$, corresponding in value to capacitor $C_1$, compensates precisely for such high frequency components and functions to produce an error-free output signal over the bandwidth of interest. Morever, one can readily appreciate by reexamination of the circuit that the foregoing relationship between capacitors $C_1$ and $C_3$ might be expected in view of the fact that the common mode feedback signal is derived from error amplifier 16 alone, and is applied to the bridge circuit as a composite signal which also includes a component representative of the useful differential signal received at amplifier input terminal 12. Since the lead or derivative control provided by capactor $C_1$ applies a derivative of this latter signal component to error amplifier 18, it follows that the output signal from amplifier 18, in the absence of the compensating signal received through capacitor $C_3$, would deliver an erroneous lead signal to the output amplifier 32. That this is so may be verified readily by analyzing the response of the circuit to a step function input signal.

As described previously with respect to the circuit of FIG. 1, all of the components and circuits employed in the amplifier of FIG. 3 may be of conventional or state of the art design. Moreover, while such circuits as those of error amplifiers 16 and 18 are preferably of reasonably sophisticated design to minimize drift, it would be possible to employ relatively simple circuits therein if the end use of the differential amplifier will permit. With reference to FIG. 4, for example, there is shown a simple p-n-p transistor circuit which could be utilized as an error amplifier, the differential input signal being applied to the base electrode 40 while the feedback signal is applied to the emitter electrode 42. Correlatively, the output current signal produced by the amplifier is extracted from collector electrode 44. It should be noted that this circuit, in addition to providing high gain and low drift further provides floating or non-grounded operation which is desired in the error amplifiers to enable differencing of the differential input signal and the feedback signal.

Figure 5:
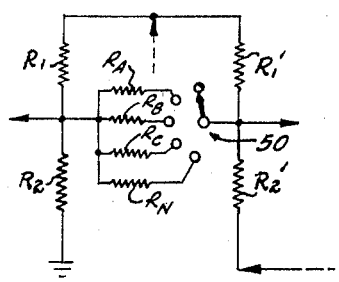
FIG. 5 is a schematic view of an alternative form of bridge circuit which provides certain advantages when incorporated in the circuits of FIGS. 1 and 3.

Before concluding the discussion of the circuit of FIG. 3, it should be noted that the bridge resistors $R_1$ and $R_2$ were assumed to be related by the ratio of one to nine while discussing the values of capacitors $C_1$ and $C_2$, whereas in discussing the amplifier circuits of FIGS. 1 and 2 these same resistors were assumed to be related by the ratio of one to nine hundred and ninety-nine. It is important to recognize that this apparent inconsistency does not actually exist in practice, and that the amplifier gain as established by the bridge resistance ratio may be varied, either continuously or in discrete steps, without varying the resistive load seen by the capacitors $C_1$ and $C_2$ in FIG. 3. More particularly, there is shown in FIG. 5 a modified bridge circuit which again includes resistors $R_1$, $R_2$, $R_1'$ and $R_2'$, and which further includes a plurality of resistors $R_A$ through $R_N$ which may be shunted selectively across bridge resistors $R_1$ and $R_1'$ through a multiple position switch 50.

If now the values of resistors $R_1$ and $R_2$ are selected so that they are interrelated by the ratio of one to nine, it will be seen that the relative values of capacitors $C_1$ and $C_2$ in the circuit of FIG. 3 are consistent as described. Moreover, it will be noted that the overall closed loop gain of the amplifier for the foregoing resistor ratio is ten when switch 50 is in the position shown in FIG. 5.

Parenthetically, it may be stated that the differential amplifier would then exhibit common mode rejection of ten thousand to one, assuming cross-referenced bridge resistor tolerances of one part in one thousand.

Assuming then that shunt resistors $R_A$ through $R_N$ have successively decreasing values, it will be recognized by those skilled in the art that insertion of successively smaller shunt resistors in the bridge circuit will lower the effective circuit values of resistors $R_1$ and $R_1'$ to the differential feedback signal in discrete steps, and thus raise the amplifier gain in discrete steps. Notwithstanding this effect, however, the value of resistor $R_1$ will remain constant at its initial value insofar as its relationship to capacitor $C_1$ is concerned.

Of equal or greater significance from the standpoint of circuit operation is the fact that the use of shunt resistors $R_A$ through $R_N$ permits preservation of the bridge resistor tolerances without using extremely precise shunting resistors associated with each of resistors $R_1$ and $R_1'$. More particularly, it will be recognized that the insertion of the shunt resistors into the bridge circuit, due to the symmetry of the bridge, lowers the effective values of resistors $R_1$ and $R_1'$ with respect to the differential signal in accordance with the following equations, wherein $R_M$ represents any one of the shunt resistors $R_A$ through $R_N$.

$$R_1 \text{ (effective)} = \frac{R_1 - \frac{R_M}{2}}{R_1 + \frac{R_M}{2}} = \frac{R_1 \cdot R_M}{2R_1 + R_M} \quad (26)$$

$$R_1' \text{ (effective)} = \frac{R_1' - \frac{R_M}{2}}{R_1' + \frac{R_M}{2}} = \frac{R_1' \cdot R_M}{2R_1 + R_M} \quad (27)$$

The foregoing equations thus state that each shunt resistor may be considered to be made up of two precise halves, each of which shunts one of the resistors $R_1$ and $R_1'$. Moreover, the equations will readily demonstrate that the effective values of $R_1$ and $R_1'$, as shunt resistance is added, are improved slightly from a tolerance standpoint over the tolerances of the original resistors $R_1$ and $R_1'$, or in other words, that variations in the values of the shunt resistors will not produce bridge imbalance, but only minor variations in closed loop gain.

It will be recognized by those skilled in the art that still other modifications and alterations may be made to the differential amplifier herein disclosed without departing from the spirit and scope of the invention. Moreover, it should also be apparent that the differential amplifier may be constructed to employ either vacuum tubes or transistors. Accordingly, it is to be expressly understood that the scope of this invention is to be limited only by the spirit and scope of the appended claims.

What is claimed as new is:

1. A differential amplifier for amplifying a differential intelligence signal applied across a pair of associated input terminals while suppressing common mode signals applied simultaneously at the input terminals, said differential amplifier comprising: a pair of input circuits coupled respectively to said input terminals, each of said input circuits being responsive to the differential intelligence signal and the common mode signal applied to its associated input terminal for producing a composite output signal representative of the signals applied thereto; first means coupled to receive the output signal from at least one of said input circuits, said first means being responsive to applied output signals for generating an error signal representative of the common mode signal; a first feedback circuit coupling said first means and said input circuits, said first feedback circuit including a resistance network connected to receive said error signal and to apply said error signal to said input circuits to compensate for the common mode signals applied thereto; second means coupled to receive the output signal from at least the other of said input circuits and operable in response to applied output signals for producing an output intelligence signal corresponding to the input differential intelligence signal; and a second feedback circuit coupling said second means and at least one of said input circuits through said resistance network for applying to apply said output intelligence signal to at least one of said pair of input circuits for controlling the gain imparted to the applied input differential intelligence signals.

2. A differential amplifier for amplifying a differential intelligence signal received across a pair of associated input conductors while simultaneously suppressing a common mode signal applied over the input conductors, said differential amplifier comprising: first and second circuits connected respectively to the pair of input conductors and responsive to the signals received thereover for producing respectively first and second output signals, each of said output signals having a common mode signal component and an intelligence signal component; a first high gain negative fedback circuit including a resistance network symmetrically coupled to said input circuits, said first feedback circuit being coupled to receive at least said first output signal and operable in response thereto to apply to said input circuits symmetrically through said resistance network a negative feedback signal representative of the common mode signal to reduce toward zero the common mode signal components of said input circuit output signals; and a high gain output circuit connected to receive at least said second output signal and operable in response thereto for producing an output intelligence signal representative of the applied differential intelligence signal, said high gain output circuit including a second negative feedback circuit connected to apply said output intelligence signal symmetrically to said resistance network for reducing the magnitude of the intelligence signal component in said second output signal for controlling the gain imparted to the applied differential intelligence signal.

3. A differential amplifier for amplifying a differential intelligence signal received across a pair of associated input conductors while simultaneously suppressing a common mode signal applied over the input conductors, said differential amplifier comprising: a pair of input circuits each having first and second input terminals and each being operable to produce an output signal corresponding to the difference between the signals received at its associated input terminals; means connecting the pair of input conductors to said first terminals of said pair of input circuits, respectively; a first feedback circuit including a high gain amplifier and a resistance network coupled symmetrically to said second terminals of said input circuits, said feedback circuit being coupled to receive the output signal from at least one of said input circuits and operable in response thereto to apply symmetrically to said input circuits a negative feedback signal representative of the common mode signal to reduce toward zero the common mode signal components in said input circuit output signals; a high gain output circuit coupled to receive the output signal from at least the other of said pair of input circuits and operable in response thereto to produce an output intelligence signal representative of the applied intelligence signal; and a second feedback circuit coupled to receive said output intelligence signal and coupled assymmetrically to said resistance network to apply said output intelligence signal to said second input terminal of said other of said input circuits for controlling the gain imparted to the input intelligence signal.

4. A differential amplifier for amplifying a differential intelligence signal received across a pair of associated input conductors while simultaneously suppressing a common mode signal applied over the input conductors, said differential amplifier comprising: first and second input circuits connected respectively to said pair of input conductors and responsive to the signals received thereover for producing a corresponding pair of output signals, each having a common mode signal component and an intelligence signal component; a resistance circuit having first and second parallel paths interconnected at a common junction, each of said parallel paths including a first resistor $R_1$ and a second resistor $R_2$, said first resistor $R_1$ being connected at one end to the common junction and at its other end in series with said second resistor $R_2$; feedback connections intercoupling the junctions of resistors $R_1$ and $R_2$ in said first and second parallel paths to said first and second input circuits, respectively; first feedback means connected to said common junction and coupled to receive the output signal from one of said input circuits and operable in response to applied output signals to apply a signal representative of the applied common mode signal to said common junction for nulling the common mode signal component in said output signals; first means coupled to receive to the output signal from the other of said input circuits and operable in response to applied output signals to produce an amplified intelligence output signal corresponding to the applied intelligence signal; and second means coupled to said first means to receive said amplified intelligence output signals and further coupled to apply said intelligence output signal to the second resistor $R_2$ whose other terminal is coupled to said other of said input circuits for controlling the closed loop gain.

5. The amplifier defined in claim 4 which further includes third means for resistance shunting the junctions of resistors $R_1$ and $R_2$ in said first and second parallel paths to vary the gain imparted to the intelligence signal.

6. A differential amplifier for amplifying an intelligence signal received across a pair of associated input conductors while simultaneously suppressing a common mode signal received over each of the input conductors, said differential amplifier comprising: first and second input circuits each having first and second input terminals and each operable to produce an output signal corresponding to the difference between the signals received at its associated input and common reference potential terminals; first means connecting the pair of input conductors to said first terminals of said first and second input circuits, respectively; a resistance circuit having first and second parallel paths interconnected at a common junction, each of said parallel paths including a first resistor $R_1$ connected at one end to said common junction and at its other end in series with a second resistor $R_2$, the junctions of resistors $R_1$ and $R_2$ in said first and second parallel paths being connected respectively to said second input terminals of said first and second input circuits; means for applying a reference potential to the end of the resistor $R_2$ remote from resistor $R_1$ in said first parallel path; a first feedback circuit including a high gain amplifier, said feedback circuit being connected to receive the output signal from at least said first input circuit and being further connected to apply to said common junction of said resistance circuit a negative feedback signal representative of the common mode signal to reduce toward zero the common mode signal components in the output signals from said input circuits; a high gain output circuit connected to receive the output signal from at least said second input circuits and operable in response to applied output signals to produce an output intelligence signal representative of the applied intelligence signal; and a second feedback circuit connected to the end of resistor $R_2$ remote from resistor $R_1$ in said second parallel path connected to said output intelligence signal to said second input terminal of said second input circuit for controlling the gain imparted to the input intelligence signal.

7. In a differential amplifier including first and second input amplifiers respectively cascaded with first and second output amplifiers for producing at an output terminal an amplified output intelligence signal corresponding to an input intelligence signal applied across the pair of input amplifiers while simultaneously suppressing common mode signals applied to both input amplifiers, the combination comprising: means connecting the first output amplifier to the output terminal; a first negative feedback circuit intercoupling the output terminal and the input circuit of said first input amplifier, said feedback circuit including a resistance network for controlling the gain imparted to the intelligence signal; and a second negative feedback circuit including said resistance network interconnecting the output circuit of said second output amplifier to the input circuits of both input amplifiers, said second feedback circuit and said resistance network being operative to suppress at the output terminal common mode signals applied to both of the input terminals.

8. In a differential amplifier for producing at an output terminal an amplified output intelligence signal corresponding to an input intelligence signal applied across the input terminals of a pair of associated input amplifiers while simultaneously suppressing common mode signals applied to both input terminals, the combination comprising: an output amplifier interconnecting one of said input amplifiers to said output terminal; a first negative feedback circuit intercoupling the output terminal to the input terminal of one of the said input amplifiers, said feedback circuit including a resistance network for controlling the gain imparted to the intelligence signal; and a second negative feedback circuit intercoupling the output circuit of the other of the input amplifiers and said resistance network, said second feedback circuit and said resistance network being responsive to common mode signals presented by the other input amplifier for applying to both input amplifiers a common mode compensating signal whereby common mode signals are suppressed from appearing at the output terminal.

9. In a differential amplifier for producing at an output terminal an amplified output intelligence signal corresponding to an input intelligence signal applied across a pair of associated input amplifiers while simultaneously suppressing common mode signals applied to both input amplifiers, the combination comprising: an output amplifier interconnecting one of said input amplifiers to said output terminal; a first negative feedback circuit intercoupling the output terminal to the input circuits of the input amplifiers, said feedback circuit including resistance network means for controlling the gain imparted to the intelligence signal; and a second negative feedback circuit interconnecting the output circuit of the other of said input amplifiers to the input circuits of both input amplifiers; said second feedback circuit also including said bridge circuit and being operative to suppress at the output terminal common mode signals applied to both of the input amplifiers.

References Cited by the Examiner

UNITED STATES PATENTS

| | | | |
|---|---|---|---|
| 2,866,018 | 12/1958 | Bell | 330—9 |
| 2,896,031 | 7/1959 | Young | 330—69 |
| 2,977,547 | 3/1961 | Talambiras | 330—69 |
| 3,046,487 | 7/1962 | Matzen et al. | 330—30 |
| 3,088,076 | 4/1963 | Burwen | 330—9 |
| 3,089,097 | 5/1963 | Bell | 330—9 |

ROY LAKE, *Primary Examiner.*

E. JAMES SAX, *Examiner.*

N. KAUFMAN, *Assistant Examiner.*

UNITED STATES PATENT OFFICE
CERTIFICATE OF CORRECTION

Patent No. 3,274,509

September 20, 1966

Stewart C. Brown

It is hereby certified that error appears in the above numbered patent requiring correction and that the said Letters Patent should read as corrected below.

Column 13, lines 6 and 7, strike out "for applying"; line 21, for "fedback" read -- feedback --; line 36, for "symmetrically" read -- asymmetrically --; column 16, line 18, for "bridge circuit" read -- resistance network means --.

This certificate supersedes the Certificate of Correction issued January 23, 1968.

Signed and sealed this 8th day of October 1968.

(SEAL)
Attest:

Edward M. Fletcher, Jr.
Attesting Officer

EDWARD J. BRENNER
Commissioner of Patents